United States Patent
Bingham et al.

(10) Patent No.: US 11,011,051 B1
(45) Date of Patent: May 18, 2021

(54) AUTOMATED BULK LOCATION-BASED ACTIONS

(71) Applicant: Alarm.com Incorporated, Tysons, VA (US)

(72) Inventors: Jasper Bingham, Arlington, VA (US); Allen Chien, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 15 days.

(21) Appl. No.: 16/676,637

(22) Filed: Nov. 7, 2019

Related U.S. Application Data

(60) Provisional application No. 62/756,686, filed on Nov. 7, 2018.

(51) Int. Cl.
| | |
|---|---|
| *G01W 1/00* | (2006.01) |
| *G08B 31/00* | (2006.01) |
| *G08B 25/00* | (2006.01) |
| *G08B 21/10* | (2006.01) |
| *H04W 4/021* | (2018.01) |
| *G08B 25/10* | (2006.01) |

(52) U.S. Cl.
CPC ............. *G08B 31/00* (2013.01); *G08B 21/10* (2013.01); *G08B 25/008* (2013.01); *G08B 25/10* (2013.01); *H04W 4/021* (2013.01)

(58) Field of Classification Search
CPC ...... G08B 31/00; G08B 25/10; G08B 25/008; G08B 21/10; G08B 27/001; H04W 4/021; G06Q 40/08; G06Q 50/06; G06Q 10/04; G01S 19/51; G06N 3/006
See application file for complete search history.

(56) References Cited

U.S. PATENT DOCUMENTS

| | | | |
|---|---|---|---|
| 5,668,929 A | 9/1997 | Foster, Jr. | |
| 6,975,220 B1 | 12/2005 | Foodman et al. | |
| 7,714,733 B2 | 5/2010 | Farley et al. | |
| 8,559,914 B2 | 10/2013 | Jones | |
| 9,826,352 B2 * | 11/2017 | Rabb | G08B 13/2491 |
| 9,947,202 B1 * | 4/2018 | Moon | G06Q 40/08 |

(Continued)

OTHER PUBLICATIONS

[No Author Listed], "Be Prepared for a Tornado," FEMA, V-1010, Mar. 2018, 2 pages.

(Continued)

*Primary Examiner* — An T Nguyen
(74) *Attorney, Agent, or Firm* — Fish & Richardson P.C.

(57) ABSTRACT

Methods, systems, and apparatus, including computer programs encoded on a computer storage medium, for automating bulk location-based actions in response to disaster events. A system obtains data defining zones related to different geographic locations and configures a set of preferences for each zone. One of the preferences is a command for responding to an event. The system detects a disaster event and determines that a location affected by the event is related to a zone defined at the system. The system obtains sensor data generated by a sensor in the zone that is connected to a monitoring system for the zone. The system generates an alert based on the sensor data and the command and provides the alert to a client device of an entity that manages properties in the zone. The alert provides an assessment of how the disaster event affects items at properties in the zone.

20 Claims, 8 Drawing Sheets

(56) References Cited

U.S. PATENT DOCUMENTS

| | | | |
|---|---|---|---|
| 10,735,909 B1* | 8/2020 | Klinkner | H04W 4/029 |
| 2004/0075552 A1* | 4/2004 | Rao | G08B 27/005 |
| | | | 340/539.1 |
| 2007/0161378 A1* | 7/2007 | Marchand | H04W 4/021 |
| | | | 455/456.1 |
| 2007/0273499 A1 | 11/2007 | Chlubek et al. | |
| 2008/0139165 A1* | 6/2008 | Gage | H04W 4/90 |
| | | | 455/404.1 |
| 2012/0046019 A1* | 2/2012 | Rodkey, Jr. | H04M 1/72577 |
| | | | 455/418 |
| 2012/0190295 A1* | 7/2012 | Kim | G08B 21/10 |
| | | | 455/3.01 |
| 2012/0280823 A1* | 11/2012 | Yang | G08B 21/10 |
| | | | 340/669 |
| 2013/0036175 A1* | 2/2013 | Lau | H04H 60/51 |
| | | | 709/206 |
| 2014/0057587 A1* | 2/2014 | Overby | H04W 76/50 |
| | | | 455/404.1 |
| 2014/0253326 A1* | 9/2014 | Cho | G08B 7/066 |
| | | | 340/539.13 |
| 2014/0257913 A1* | 9/2014 | Ball | G06Q 10/04 |
| | | | 705/7.25 |
| 2016/0189529 A1* | 6/2016 | Lee | G08B 13/22 |
| | | | 340/541 |
| 2017/0018167 A1* | 1/2017 | Dey | G08B 29/20 |
| 2017/0031735 A1* | 2/2017 | Levien | G06F 9/542 |
| 2017/0134895 A1* | 5/2017 | Rabb | G08B 29/24 |
| 2017/0238157 A1* | 8/2017 | Best | G08B 27/005 |
| | | | 455/404.1 |
| 2017/0301220 A1 | 10/2017 | Jarrell et al. | |
| 2018/0165945 A1* | 6/2018 | McClendon | H04W 4/024 |
| 2020/0143481 A1* | 5/2020 | Brown | G06Q 40/08 |

OTHER PUBLICATIONS

[No Author Listed], "Be Prepared for a Thunderstorm, Lightning, or Hail," FEMA, V-1009, May 2018, 2 pages.

* cited by examiner

Breakdown of Features by Disaster Type

500

| Disaster Type | Public DB (within US) | Relevant sensors & their uses | Default bulk actions |
|---|---|---|---|
| Earthquake | USGS, Ready.gov | <ul><li>Accelerometer, gyroscope-vibration detection</li><li>Glass break sensors-damage to windows and doors</li><li>Contact sensors-doors/windows were thrown open or destroyed</li><li>Flood sensors-broken water pipes</li><li>Gas/carbon monoxide sensors-broken gas lines</li><li>Smoke detectors-fire</li><li>Power sensors-loss of power</li><li>Cameras-visual verification</li></ul> | <ul><li>Turn off water and gas lines</li><li>Turn off all appliances</li><li>Alert authorities via the security panel at all locations where sensors could confirm damage</li><li>Send text/voice/push messages/notifications to local managers/tenants with relevant safety information</li></ul> |
| Hurricane/Tropical storm | NOAA, Ready.gov | <ul><li>Glass break sensors-damage to windows and doors</li><li>Contact sensors-doors/windows were thrown open or destroyed</li><li>Flood sensors-broken water pipes</li><li>Water level sensors-water height</li><li>Precipitation sensors-rain and water detection</li><li>Gas/carbon monoxide sensors-broken gas lines</li><li>Smoke detectors-fire</li><li>Power sensors-loss of power</li><li>Cameras-visual verification</li></ul> | <ul><li>Turn off water and gas lines</li><li>Turn off all appliances</li><li>Alert authorities via the security panel at all locations where sensors could confirm damage</li><li>Send text/voice/push messages/notification to local manages/tenants with relevant information</li></ul> |
| Flooding | NOAA, GDACS, Ready.gov | <ul><li>Glass break sensors-damage to windows and doors</li><li>Contact sensors-doors/windows were thrown open or destroyed</li><li>Flood sensors-broken water pipes</li><li>Water level sensors-water height</li><li>Precipitation sensors-rain and water detection</li><li>Gas/carbon monoxide sensors-broken gas lines</li><li>Smoke detectors-fire</li><li>Power sensors-loss of power</li><li>Camera-visual verification</li></ul> | <ul><li>Turn off water and gas lines</li><li>Turn off all appliances</li><li>Alert authorities via the security panel at all locations Where sensors could confirm damage</li><li>Send text/voice/push messages/notifications to local managers/tenants with relevant safety information</li></ul> |

| 510 | | | |
|---|---|---|---|
| Tsunami | NOAA, Ready.gov | • Glass break sensors-damage to windows and doors<br>• Contact sensors-doors/windows were thrown open or destroyed<br>• Flood sensors-broken water pipes<br>• Water level sensors-water height<br>• Precipitation sensors-rain and water detection<br>• Gas/carbon monoxide sensors-broken gas lines<br>• Smoke detectors-fire<br>• Power sensors-loss of power<br>• Cameras-visual verification | • Turn off water and gas lines<br>• Turn off all appliances<br>• Alert authorities via security panel at all locations where sensors could confirm damage<br>• Send text/voice/push messages/notifications to local managers/tenants with relevant safety information |
| Terror | National Terror Advisory System, Ready.gov | • Glass break sensors-damage to windows and doors<br>• Contact sensors-doors/windows were thrown open or destroyed<br>• Flood sensors-broken water pipes<br>• Gas/carbon monoxide sensors-broken gas lines<br>• Smoke detectors-fire<br>• Power sensors-loss of power<br>• Cameras-visual verification | • Arm the system<br>• Alert authorities via the security panel at all locations where sensors could confirm damage<br>• Send text/voice messages to local managers/tenants with relevant safety information |
| Fire (incl. Forest fire, volcano) | NOAA, Ready.gov | • Gas/carbon monoxide sensors-broken gas lines<br>• Smoke detectors-fire<br>• Heat sensor-heat/fire<br>• Flood sensors-broken water pipes<br>• Sprinklers-whether activated<br>• Temperature sensor-change in temperature<br>• Power sensors-loss of power<br>• Cameras-visual verification | • Turn off gas lines<br>• Turn off thermostat and fan<br>• Turn off all appliances<br>• Alert authorities via the security panel at all locations where sensors could confirm damage<br>• Send text/voice/push messages/notifications to local managers/tenants with relevant safety information |
| Active Shooter | Ready.gov | • Glass break sensors-damage to windows and doors<br>• Contact sensors-doors/windows were thrown open or destroyed<br>• Cameras-visual verification | • Arm the system<br>• Active siren<br>• Alert authorities via the security panel at all locations where sensors could confirm damage<br>• Send text/voice messages to local managers/tenants with relevant safety information |
| Snowstorm/ Extreme heat | NOAA, Ready.gov | • Glass break sensors-damage to windows and doors<br>• Contact sensors-doors/windows were thrown open or destroyed<br>• Flood sensors-broken water pipes<br>• Temperature sensor-change in temperature | • Adjust thermostat accordingly<br>• Alert authorities via the security panel at all locations where sensors could confirm damage<br>• Send text/voice/push messages/notifications to local managers/tenants with relevant safety information |

| | | | |
|---|---|---|---|
| Snowstorm/Extreme heat | NOAA, Ready.gov | • Glass break sensors-damage to windows and doors<br>• Contact sensors-doors/windows were thrown open or destroyed<br>• Flood sensors-broken water pipes | • Adjust thermostat accordingly<br>• Alert authorities via the security panel at all locations where sensors could confirm damage<br>• Send text/voice/push messages/notifications to local managers/tenants with relevant safety information |
| | | • Temperature sensor-change in temperature<br>• Gas/carbon monoxide-broken gas lines<br>• Smoke detectors-fire<br>• Power sensors-loss of power<br>• Cameras-visual verification<br>• Robotic devices/Drones | • Obtain drone sensor information<br>• Navigate robotic devices and sensors around property to obtain robotic device sensors information |
| Power outages | EIA, PowerOutage.us | • Glass break sensors-damage to windows and doors<br>• Contact sensors-door/windows were thrown open or destroyed<br>• Gas/carbon monoxide sensors-broken gas lines<br>• Smoke detectors-fire<br>• Power sensors-loss of power<br>• Cameras-visual verification | • Alert authorities via the security panel at all locations where sensors could confirm damage<br>• Send text/voice/push messages/notifications to local managers/tenants with relevant safety information |

Bulk actions available to user
- Arm/disarm the system
- Activate/deactivate siren
- Turn on/off water valve
- Turn on/off gas lines
- Turn on/off thermostat and fan
- Turn on/off all appliances
- Lock/unlock the doors
- Record video clips
- Alert authorities via the security panel at all locations where sensors could confirm damage
- Send text/voice/push messages/notifications to local managers/tenants with relevant safety information

AUTOMATED BULK LOCATION-BASED ACTIONS

CROSS REFERENCE TO RELATED APPLICATION

This application claims the benefit of U.S. Provisional Application No. 62/756,686, filed on Nov. 7, 2018, which is incorporated herein by reference in its entirety.

FIELD

This specification relates to electronic devices for a property.

BACKGROUND

Monitoring devices and sensors are often dispersed at various locations at a property, such as a home or commercial business. These devices and sensors can have distinct functions at different locations of the property. Some sensors at a property offer different types of monitoring and control functionality. The control functionality afforded by these sensors and devices can be leveraged to obtain information about items at respective properties that are located in certain areas or geographic locations.

SUMMARY

One aspect of the subject matter described in this specification can be embodied in a computer-implemented method. The method, includes, obtaining, at a monitoring server, data that defines a zone among multiple zones, each zone being related to a respective geographic location. For each zone among the multiple zones, the method includes, configuring, by the monitoring server, a set of preferences, at least one preference in the set of preferences being a predefined command for responding to an event.

The method also includes, detecting an occurrence of a disaster event that affects a particular geographic location; determining, by the monitoring server, whether the particular geographic location that is affected by the disaster event is linked to a first zone that is defined at the monitoring server; and in response to determining that the particular geographic location affected by the disaster event is linked to the first zone, obtaining sensor data generated by a sensor at the first zone, the sensor being connected to a property monitoring system of the first zone.

The method further includes, generating, by the monitoring server and based on the sensor data, an alert that includes a report, wherein the report provides an assessment of how the disaster event affects an item at a property in the first zone; and providing, using the monitoring server, the alert to a client device of an entity that manages the property in the first zone.

These and other implementations can each optionally include one or more of the following features. For example, in some implementations, the method further includes: providing, by the monitoring server and based on the sensor data, a first command to the property monitoring system of the first zone using at least the predefined command in the set of preferences, wherein the predefined command causes the property monitoring system to perform a specific action as a response measure to the occurrence of the disaster event.

In some implementations, the method further includes: performing, by the property monitoring system of the first zone, the specific action as a response measure to the occurrence of the disaster event, wherein the specific action is an arming function that activates a security protocol of the property monitoring system. In some implementations, the sensor data indicates whether an item located at the first zone is affected by the disaster event.

In some implementations, detecting the occurrence of the disaster event that affects the particular geographic location includes: obtaining, by the monitoring server, new data from an external database, the new data describing one or more disaster events associated with certain geographic locations; iteratively analyzing, by the monitoring server, the new data to identify a particular geographic location as being affected by the disaster event; and detecting the occurrence of the disaster event in response to iteratively analyzing the new data.

In some implementations, determining that the particular geographic location affected by the disaster event is linked to the first zone includes: determining that the first zone is within a threshold proximity of the particular geographic location such that items at a property located within the first zone will be affected by the disaster event. In some implementations, the set of preferences further includes one or more of: an alert timeout preference; a user notification preference; a default action preference; or an inaction preference.

In some implementations, the alert timeout preference specifies whether the property monitoring system: performs the default action preference after a predefined timeout period ends without the monitoring server receiving a response to the alert; or selects the inaction preference after the predefined timeout period ends without the monitoring server receiving a response to the alert.

In some implementations, the disaster assessment report includes one or more active links, each active link enabling the client device to: adjust one or more preferences in the set of preferences; provide a second, different command to the property monitoring system to cause the property monitoring system to perform a particular action; or transmit a bulk action command to one or more property monitoring systems for each property in the first zone.

In some implementations, the method further includes: determining that a zone is not defined for a geographic location affected by the disaster event; in response to determining that a zone is not defined for a geographic location affected by the disaster event, automatically creating a new, second zone; and automatically storing the new, second zone at a storage medium of the monitoring server.

In some implementations, obtaining the sensor data from the sensor at the first zone includes: analyzing, by the monitoring server, the sensor data; and in response to analyzing the sensor data, determining, by the monitoring server, whether items located at the first zone have been affected by the disaster event.

In some implementations, the sensor at the first zone includes at least one of: an accelerometer sensor; a glass break sensor configured to detect damage to an item at the first zone; or an item location sensor configured to detect a physical location of an item relative to a location of the first zone. In some implementations, the sensor at the first zone includes at least one of: a flood detection sensor; a gas or fluid sensor; a smoke detection sensor; or a power sensor configured to detect a loss of electrical power at the zone.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

FIGS. 5A, 5B, and 5C each show a breakdown of features by event type.

Like reference numbers and designations in the various drawings indicate like elements.

DETAILED DESCRIPTION

Figure 1:
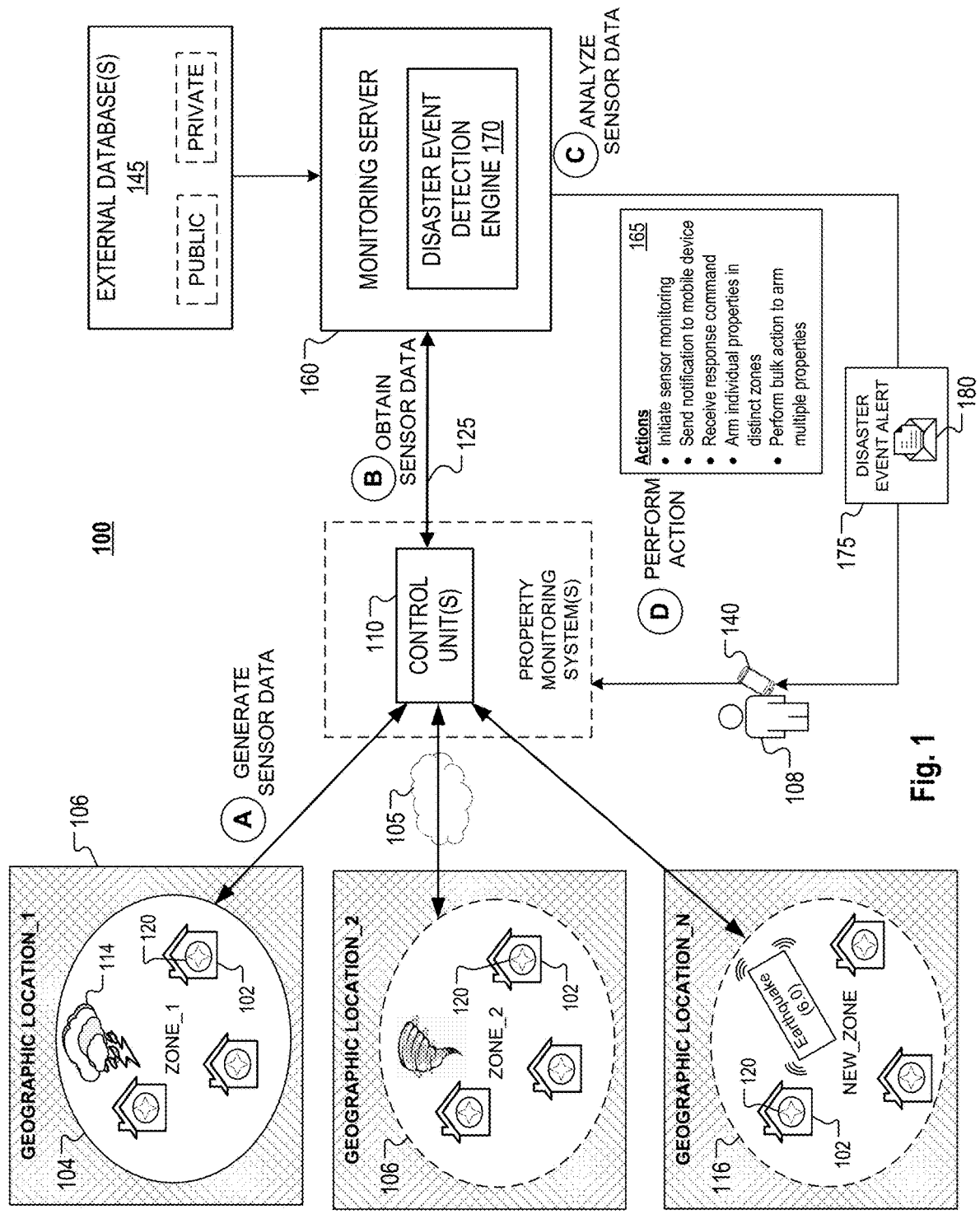
FIG. 1 shows a block diagram of a computing system for performing one or more actions at a property.

A property, such as a house or a place of business, can be equipped with a monitoring system to enhance the security of the property. The property monitoring system may include one or more sensors, such as motion sensors, camera/digital image sensors, temperature sensors, water usage sensors, or electricity usage sensors distributed about the property to monitor conditions at the property. In many cases, the monitoring system also includes a control unit and one or more controls, which enable automation of various actions at the property, such as setting a thermostat, controlling water usage, controlling gas usage, controlling electricity usage at the property, or triggering actions or commands to arm or disarm a security system at the property. Sensors of the monitoring system may each be configured to provide certain types of sensor data, to the control unit, about various types of activities occurring at the property.

Several sensors of the property monitoring system are often allocated or positioned at various locations of a property or home. The sensor data generated by the sensors can describe or indicate a status of items at the property or provide imagery that gives insight into certain conditions at the property. The items at the property can include windows, doors, vehicles, pipes, physical structures, and other related items or products that are typically located at a home or commercial property for use by the occupants or tenants of the property. Ensuring or maintaining the safety and serviceability of certain items and physical structures at a property is often an important goal for a property manager.

However, unfortunate events (e.g., natural disasters, terror attacks, or even active shooters) may sometimes occur at the property or within close proximity to the property. These events can potentially damage, destroy, or otherwise negatively affect the condition of items on the property.

In this context, techniques are described for a computing system that enables performing one or more bulk actions at each property that is located in a zone defined using a monitoring server of the described system. At least one zone can be a particular location within a larger geographic location and each zone can be automatically defined by the system, or manually created by a user of the computing system. The described techniques can be used to quickly respond to disaster events that occur at or near a property in a zone associated with a property manager.

A website or smart home application program that interacts with the computing system can include an example filter function that enables a user to filter on their existing properties by location. This filter feature is configured such that a property manager does not have to scramble to determine all of their property locations that may be affected by a disaster event such as a hurricane or tornado. The computing system is also configured to perform various bulk actions (e.g., arm all locations) as well as to proactively alert a property manager that a disaster has occurred. The following use cases briefly illustrate the various features afforded by the techniques described in this document.

Under a first example use case, a commercial security manager (e.g., a user) wants to ensure the safety and security of their properties in respective zones that are indicated as being vulnerable to a natural disaster, such as a hurricane, tornado, or earthquake. The security manager or user accesses their user account of an example alarm or security company (e.g., Alarm.com website). For example, the security manager uses their access credentials to log onto the Alarm.com website. The website can include a disaster event filter function and the user can apply an earthquake history filter to see that several of their properties are in an active earthquake zone or that at least one property is located in a particular geographic location that overlaps (or partially overlaps) with an active earthquake/disaster zone.

The system receives user input from the user/security manager which indicates a selection of an area that encompasses the active earthquake zone. In addition to selecting the area, the user can assign a name to the selected area, e.g., "Zone_1," or "Earthquake Zone." In this manner, the system processes the user input provided by the user to define one or more zones that encompasses the active earthquake zone. The system also receives user input for setting up at least one rule so that when there is an earthquake at a location within the zone, within close proximity to the zone, or within a threshold distance of a property in the zone, the system can automatically arm a security system for the property. The system triggers or transmits an alert that is received at a mobile device of the user to provide details of the earthquake event and indicate that armed status of the security system of the property.

Under a second example use case, a property manager/user wants to automatically respond to disasters as soon as possible after the monitoring server detects that a disaster event is likely to affect a property managed by the user. The monitoring server enrolls the user in zone creation program. For example, the monitoring server receives and processes user input signals to enroll the user in an automatic arming zone creation program. Enrollment in the zone creation program enables automatic triggering of one or more default bulk-actions in response to detection of a disaster event that affects a property. So, when a natural disaster or terror attack occurs within a nearby location of a property associated with the user's account, relevant data, e.g., sensor data or information describing the event, is pushed to or obtained by the monitoring server.

In response to detection of the disaster event, the monitoring server can be configured such that a location zone for arming all monitoring systems for respective properties within the zone is automatically created and saved for the property manager. After the location zone is automatically created and saved, the server can then transmit a command to arm all the security/monitoring systems for the respective properties. In addition to arming the security systems, the monitoring server can provide an alert to notify the property manager about the zone's creation and about the arming command that was transmitted to arm the systems for each property. The property manager can access their user account to view details of the alert or to adjust the arming settings for each property included in the zone.

FIG. 1 shows a block diagram of an example computing system 100 that can be used to perform one or more bulk actions, or default bulk actions, at a property 102. The property 102 may be, for example, a residence, such as a single family home, a townhouse, a condominium, or an apartment. In some examples, the property 102 may be a commercial property, a place of business, or a public property.

The system 100 can include multiple sensors 120. Each sensor 120 can be associated with various types of devices that are located at property 102, including one or more monitoring or control functions associated with systems and devices of the property 102. For example, a sensor can be associated with a video or image recording device located at the property 102, such as a digital camera or other electronic recording device. Similarly, a sensor(s) can be associated with respective utility meters, such as water, gas, or electricity meters, utility control devices, and systems that control the activation or deactivation of utility functions at property 102. As described above, the property 102 is monitored by a property monitoring system. The property monitoring system includes a control unit 110 that sends sensor data 125 obtained using sensors 120 to a remote monitoring server 160. In some implementations, the property monitoring systems and monitoring servers 160 described herein are sub-systems of system 100.

The monitoring server 160 is configured to create or define one or more zones 104 and configure a set of preferences for each zone 104. For example, a user 108 can use the monitoring server 160 to manually define a zone 104 and manually configure a set of preferences for the zone. Alternatively, the monitoring server 160 can also automatically create one or more zones 116 based on existing data and information about a property that is stored at system 100. As shown at FIG. 1, each manually created zone 104, or automatically created new zone 116, can be located within an example larger geographic location 106. The data and information used to automatically create a zone 116 can be for a property 102 that is assigned to a user account of a property owner or person that manages the property 102. For example, the monitoring server 160 can determine that a potential disaster event 114 is likely to impact a property 102 and automatically define or create a new zone 116 that includes each property that is assigned to, or associated with, a particular user 108.

In some implementations, the set of preferences can include one or more user notification preferences that are used for contacting or alerting the user in response to the monitoring server 160 detecting an occurrence of an event 114. For example, at least one notification preference can specify a desired alert timeout feature (described below) that is used by the system 100 to alert the user about a potential disaster event 114. At least one preference specifies whether the monitoring server 160: i) defaults to a particular action if the property manager does not respond to a disaster alert 180 within a predefined timeout setting; or ii) defaults to no action (inaction) if the property manager does not respond to the disaster alert 180 within the predefined timeout setting.

As described in more detail below, the monitoring server 160 references the set of preferences for a zone 104 to determine a default action (e.g., a bulk action) to be performed at a property 102 in the zone 104. The monitoring server 160 may reference the preferences to determine the default action in response to first confirming that the event 114 has caused damage, or is likely to cause damage, to items at the property 102. For example, the monitoring server 160 can reference sensor data 125 generated by sensors 120 to first confirm that damage has occurred to items at the property 102. In some implementations, if sensors 120 cannot be used to confirm damage or unusual activity after (or during) a disaster event 114, then monitoring server 160 is configured to not perform a default action without first obtaining user confirmation or consent to perform the action.

In general, when a disaster event 114 occurs, a record may be logged in a relevant external database 145, such as a public/government database or a private database managed by a corporate entity. For example, a U.S. government services (USGS) database may record characteristics of various types of events, including natural disasters, storm systems, or even terror attacks. In some cases, the external database 145 records information about disaster events 114, such as hurricanes, tropical storms, tornados, or earthquakes. For example, the recorded information can specify a geographic location of the disaster event 114 and attributes of the disaster event, such as magnitudes for earthquakes or temperature, wind speed, and precipitation for tropical storms, hurricanes, and tornados.

Monitoring server 160 includes an event detection engine 170 (described below) that is configured to detect an occurrence of a disaster event that affects a particular geographic location 106. The monitoring server 160 is configured to pull or obtain new data from external database 145 and use the event detection engine 170 to analyze the new data. In response to analyzing the new data, the monitoring server 160 may detect that a user's property 102 is in zone 104 of a geographic location 106 that is affected by a disaster event 114.

In some implementations, if no user-created zone 104 exists within system 100 that covers all potentially affected locations, then monitoring server 160 is configured to automatically define or create a new zone 116, assign a temporary name (e.g., a temporary name) to the new zone, and save data describing the new zone 116 at system 100. The automatic creation of the new zone 116 enables an example user to continually and easily perform a bulk action(s) in an immediate aftermath (e.g., 24 hours) of a disaster event 114, as the user receives updated information about the disaster event 114 from system 100.

Referring again to the sensors at the property 102, monitoring server 160 pulls or obtains sensor and camera data 125 from one or more sensors 120 positioned at the locations of a user's property 102 in the zone 104. The monitoring server 160 can use event detection engine 170 to analyze the obtained sensor data 125 to determine if there is evidence that a disaster event 114 occurred at the property 102. For example, the relevant sensors in a disaster event scenario (earthquake) would include: accelerometers that indicate shaking, glass break sensors that indicate damage to windows and doors, contact sensors that indicate doors/windows were thrown open or destroyed, flood sensors that indicate broken water pipes, gas/carbon monoxide sensors that may indicate broken gas lines, smoke detectors that indicate a fire, electricity/power sensors that indicate loss of power, or video analytics technology that can compare before and after images to determine whether the earthquake, or other related disaster event 114, shifted things around at the property 102.

Each of the sensors 120 can use various types of technology to transmit sensor signal data or to exchange data communications with devices of system 100 (or the property monitoring system). In some implementations, one or more sensors 120 at the property 102 can be at least one of: a Z-Wave enabled sensing device, a Bluetooth enabled sensing device, a Wi-Fi enabled sensing device, or a sensing device that uses radio or wireless signal technology. Additional sensor features are described in more detail below.

The property monitoring system and the control unit 110 can be located at the property 102 or at a remote location relative to a location of the property 102. In some implementations, the control unit 110 is located at the property 110, while other units and devices that form the property monitoring system are located at a remote location. In other implementations, a single property monitoring system can manage or control security features at one or multiple properties, to enhance the security of each property. Alternatively, each property 102 can include its own respective property monitoring system for managing or controlling security features at the property.

The sensors 120 generate sensor data 125 describing various types of sensed activity at the property 102. For example, the sensors 120 can be one or more of a motion sensor, a water sensor, a water meter, a pipe sensor, a flowrate sensor, a shut-off valve position sensor, an electricity sensor, an electric metering sensor, a special-purpose sensor, or various other types of sensors configured to sense certain conditions, statuses, or activities at the property 102. The sensors 120 can also include one or more of a microphone, an audio or sound sensor, or an air quality sensor. In some implementations, at least one sensor 120 is a sensor that is installed at a utility meter or that communicates with a utility meter (e.g., a water meter or a gas meter). This particular sensor can be configured to control the flow or accessibility of water or gas at the property 102.

Each of the one or more sensors 120 is configured to generate sensor data 125 that includes information such as activity or status data (e.g., activity parameters) and parameter values that describe or indicate different types of sensed activity at the property 102. Activity parameters can include pixel values for image or video data collected at the property as well as parameter values for other types of graphical data representations indicating a status or condition of certain items and access control points at the property. Activity parameters can also include parameter values that indicates water, gas, or other fluids are flowing/moving through a medium (e.g., pipes) at the property 102. The medium can be example piping or plumbing lines 112 that form a plumbing system or gas lines installed at property 102. At least one activity parameter can include a parameter value that indicates whether electricity is being supplied to the property or an activation status of various security features that are installed at the property 102.

Control unit 110 can be located at the property 102 and may be a computer system or other electronic device configured to communicate with the sensors 120 to cause various functions to be performed for the property monitoring system or system 100. The control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded or dedicated hardware. The control unit 110 may also include software, which configures the unit to perform the functions described in this document.

In some implementations, a user 108 communicates with the control unit 110 through a network connection, such as a wired or wireless connection. As indicated above, the user can be a property owner, security manager, property manager, or occupant/resident of the property 102. In some implementations, the property owner or user 108 communicates with the control unit 110 through a software ("smart home") application installed on their mobile device 140. The control unit 110 can perform various operations related to the property 102 by sending commands to one or more of the sensors 120 at the property 102. For example, the control unit 110 can activate a camera, change a thermostat setting, lock or unlock a door/window, open or close a garage door, activate/arm an alarm system, de-activate/de-arm the alarm system, activate or deactivate a shut-off valve, or power on or off a light of the property 102. As described in more detail below, the user 108 can use mobile device 140 to interact with the smart home application and provide commands to the sensors 120, via the control unit 110, to perform the various operations described in this document.

The control unit 110 can communicate with the remote monitoring server 160 via a long-range data link. The long-range data link can include any combination of wired and wireless data networks. For example, the control unit 110 may exchange information with the monitoring server 160 through a wide-area-network (WAN), a cellular telephony network, a cable connection, a digital subscriber line (DSL), a satellite connection, or other electronic means for data transmission. The control unit 110 and the monitoring server 160 may exchange information using any one or more of various communication synchronous or asynchronous protocols, including the 802.11 family of protocols, GSM, 3G, 4G, 5G, LTE, CDMA-based data exchange or other techniques.

In some implementations, the control unit 110 also communicates with an authorized user mobile device 140, possibly through the network 105. The user mobile device 140 may be associated with a user 108, such as property owner or a resident of the property 102 and may be, for example, a portable personal computing device, such as a cellphone, a smartphone, a tablet, a mobile device, or other electronic device. In some examples, the mobile device 140 is an electronic home assistant or a smart speaker. As indicated above, system 100 interacts with a monitoring server 160, which may be remote from the property 102. The monitoring server 160 can be, for example, one or more computer systems, server systems, or other computing devices. In some implementations, the monitoring server 160 is a cloud computing platform.

The sensors 120 communicates with the control unit 110, for example, through a network 105. The network 105 may be any communication infrastructure that supports the electronic exchange of sensor data 125 between the control unit 110 and the sensors 120. The network 105 may include a local area network (LAN), a wide area network (WAN), the Internet, or other network topology. The network 105 may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, the network 105 may include optical data links. To support communications through the network 105, one or more devices of the property monitoring system may include communication modules, such as a modem, transceiver, modulator, or other hardware or software configured to enable the device to communicate electronic data through the network 105.

The sensors 120 can receive, via network 105, a wireless (or wired) signal that controls operation of each sensor 120. For example, the signal can cause the sensors 120 to initialize or activate to sense activity at the property 102 and generate sensor data 125. The sensors 120 can receive the signal from monitoring server 160 or from control unit 110 that communicates with monitoring server 160. In addition to detecting and processing wireless signals received via network 105, the sensors 120 can also transmit wireless signals that encode sensor data 125 describing activities at the property 102. In some implementations, the sensors 120 may include, for example, various types of signal processing sensors or related wireless sensors that are resilient to certain weather conditions that may be present at the property 102.

The monitoring server 160 receives and analyzes the sensor data 125 encoded in wireless signals transmitted by the sensors 120. For example, the monitoring server 160 analyzes the sensor data 125 encoded in the wireless signals to determine a status or condition of an item that is used by a person at the property. The item can be a known household or commercial property item, such as windows, doors, vehicles, physical structures, mobile structures, or other related items typically located at a property. The monitoring server 160 performs various functions relating to analyzing or monitoring video and image data as well as other sensor parameter values included in the sensor data 125.

As discussed above, the monitoring server 160 includes an event detection engine 170. The event detection engine 170 can be a disaster event detection engine configured to detect one or more events, e.g., disaster events, which may be occurring at a given geographic location 106 that is linked or related to a zone 104. In general, a geographic location 106 may be related to a zone 104 when the zone is defined as being within the geographic location 106 or within a threshold proximity to the geographic location 106. In some implementations, the monitoring server 160 uses the detection engine 170 to process imagery and activity data indicated by parameters of the sensor data 125 to determine whether a disaster event has adversely affected, will adversely affect, or is presently adversely affecting, one or more items at a property 102.

In some implementations, the detection engine 170 is an example machine-learning engine that is configured to process data obtained from database 145 as well as sensor data 125 obtained from the sensors 120 at the property 102. The data obtained from database 145 may describe events (e.g., weather systems or terror attacks) having potential to adversely affect the property 102 or items located at the property. The machine-learning engine can process the obtained data from database 145 and sensor data 125 to train a predictive model. The predictive model can be based on an artificial neural network of the machine-learning engine that is trained to predict or infer that a particular event will adversely affect property 102. The predictive model can process the sensor data 125 with reference to information in the data obtained from database 145. In response to processing the sensor data 125, the predictive model is operable to generate inferences about a respective condition of items located at one or more of the properties that are in a particular zone. For example, the predictive model is operable to generate the inferences based on parameter values in the sensor data 125 that represents activity detected by the sensors 120 at a property 102. In some examples, the parameter values correspond to imagery, location data, status/activity data, or other values that can be processed by a predictive model to infer or predict a current or prospective condition of an item.

In some implementations, the prediction or inference generated by the predictive model is represented by a numerical prediction score (e.g., 0.8) that indicates a probability of a disaster event affecting property 102. The detection engine 170 can compare the numerical score to a threshold score to determine whether a disaster event will adversely affect items at property 102. For example, the detection engine 170 determines whether the prediction score (e.g., 0.83) exceeds a threshold prediction score (e.g., 0.70). In response to determining that the prediction score exceeds the threshold prediction score, the detection engine 170 detects an occurrence of a disaster event that affects the property 102 or a particular geographic location, such as a geographic location 106 that defines a zone 104 that includes multiple properties 102.

In response to detecting occurrence of the disaster event 114, the monitoring server 160 obtains sensor data 125, via control unit 110, uses the sensor data 125 to generate an alert 175 that includes an event assessment report 180. For example, the monitoring server 160 packages obtained sensor data 125 into a short assessment report 180 and transmits an alert 175 that includes the report 180 to the mobile device 140 of user (property manager) 108. For example, the alert 175 can state that "USGS reported an earthquake, magnitude 7.5, which may have affected your locations in [Zone Name]. Sensors and video data confirm unusual activity at and/or damage to 5 of your property locations within [Zone Name]."

In some implementations, the alert 175 includes at least one hyperlink to perform one or more of the following actions: a) an ignore action; b) perform default bulk actions; or c) perform custom bulk actions. For both actions b) and c, the user 108 can specify, e.g., based on the set of preferences, which property locations in a particular zone 104 the user wants to apply actions to. In some implementations, the system 100 defaults to applying a particular action to all locations, unless instructed otherwise by the user 108. In some cases, if the user 108 does not respond to the alert 175 within a predefined timeout period, then the monitoring server 160 performs a default action in accordance with the user's set of preferences or in accordance with one or more back-up bulk action preferences that may be automatically defined by the monitoring server 160. The predefined timeout period can be a user specified timeout period or a timeout period that is automatically defined by the monitoring server 160.

The ignore action (a) would be relevant if a disaster event 114 seems insignificant or sensors/cameras 120 are unable to verify damage or unusual activity at property 102. For the default bulk actions (b), monitoring server 160 is configured to show or indicate the specific types of bulk actions that are included in a set of default bulk actions. For example, if an earthquake disaster event 114 is detected, the set of default actions can include: i) turn off water and gas lines; ii) turn off all appliances; iii) alert authorities via a security panel at all property locations where sensors 120 confirmed damaged to items; or iv) send text messages to local managers/tenants with relevant safety information. For the custom bulk actions (c), monitoring server 160 is configured such that a user 108 is presented with a list of bulk actions from which the user can quickly and efficiently select and apply a subset of bulk actions to particular properties 102 within a given zone 104.

FIG. 1 includes stages A through D, which represent a flow of data. In stage (A), each of the one or more sensors 120 generate sensor data 125 including video data and digital images as well as parameter values that describe different types of sensed activity at the property 102. In some implementations, the control unit 110 (e.g., located at the property 102) collects and sends the sensor data 125 to the remote monitoring server 160 for processing and analysis at the monitoring server.

In stage (B), the monitoring server 160 receives or obtains sensor data 125 from the control unit 110. As discussed above, the monitoring server 160 can communicate electronically with the control unit 110 through a wireless network, such as a cellular telephony or data network, through any of various communication protocols (e.g., GSM, LTE, CDMA, 3G, 4G, 5G, 802.11 family, etc.). In some implementations, the monitoring server 160 receives or obtains sensor data 125 from the individual sensors rather than from control unit 110.

In stage (C), the monitoring server 160 analyzes the sensor signal data 125 and/or other property data received from the control unit 110 or directly from sensors/devices 120 located at the property 102. As indicated above, the monitoring server 160 analyzes the sensor data 125 to determine whether items at a property 102 have been damaged or otherwise adversely affected by disaster event 114. In some implementations, sensors 120 are configured to generate image data, motion data, or other related activity sensor data 125 every second, every two seconds, or based on some other predefined time schedule. The sensor data 125 can be recorded to a control unit 110 (e.g., every two seconds) after being obtained by the sensor 120.

In some cases, the sensor data 125 is transmitted to monitoring server 160, where server 160 determines one or more usage or activity patterns and data correlations based on analysis of the sensor data 125. The monitoring server 160 can build a suspected event history in response to analyzing sensor data 125 generated by each of the different sensors 120 located at the property 102. In other cases, analysis of sensor data 125 is performed on a local sensing device of system 100, as different events relating to item damage from a disaster event 114 are detected locally at each sensor 120.

Based on the data analysis, in stage (D), the monitoring server 160 performs various actions. In some cases, the monitoring server 160 performs the various actions as a default function based on the predefined preferences in the set of preferences that were previously configured. In other cases, the monitoring server 160 performs the various actions in response to receiving user commands from mobile device 140. For example, the monitoring server 160 can initiate sensor monitoring, send notifications or alerts to mobile device 140, receive response commands from mobile device 140, arm individual properties 102 in distinct zones 104, perform bulk actions to arm/disarm multiple properties 102 within different zones 104.

In some implementations, the monitoring server 160 is configured to generate a notification or disaster alert 175 that is provided for output at device 140. The notification can include a report 180 that shows, describes, or otherwise indicates a condition of items located at the property within a zone. In some cases, the notification or alert 175 (e.g., a text message or e-mail) includes embedded code, such as an active web-link or uniform resource locator (URL), configured to detect user input that interacts with the notification. The detected user input can trigger retrieval of the report 180 for display at the mobile device 140.

Though the stages are described above in order of (A) through (D), it is to be understood that other sequencings are possible and disclosed by the present description. For example, in some implementations, the monitoring server 160 may receive sensor data 125 from the control unit 110 that includes both sensor status information and usage data 126 for each sensor 120. In some cases, aspects of one or more stages may be omitted. For example, in some implementations, the monitoring server 160 may receive and/or analyze sensor data 125 that includes only usage information rather than both sensor status information and usage data.

Figure 2A:
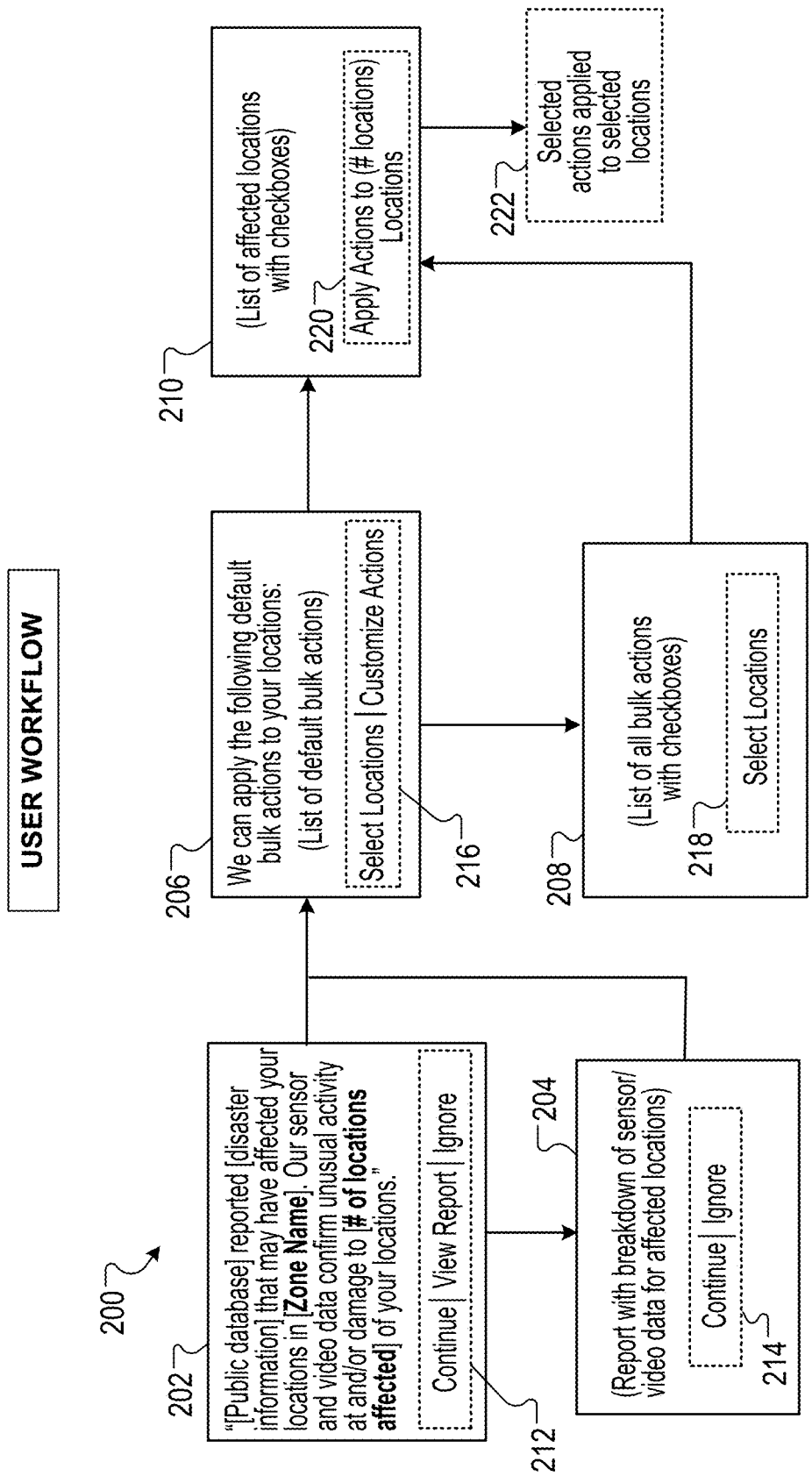
FIGS. 2A and 2B each show an example process for performing bulk actions at a property.
Figure 2B:
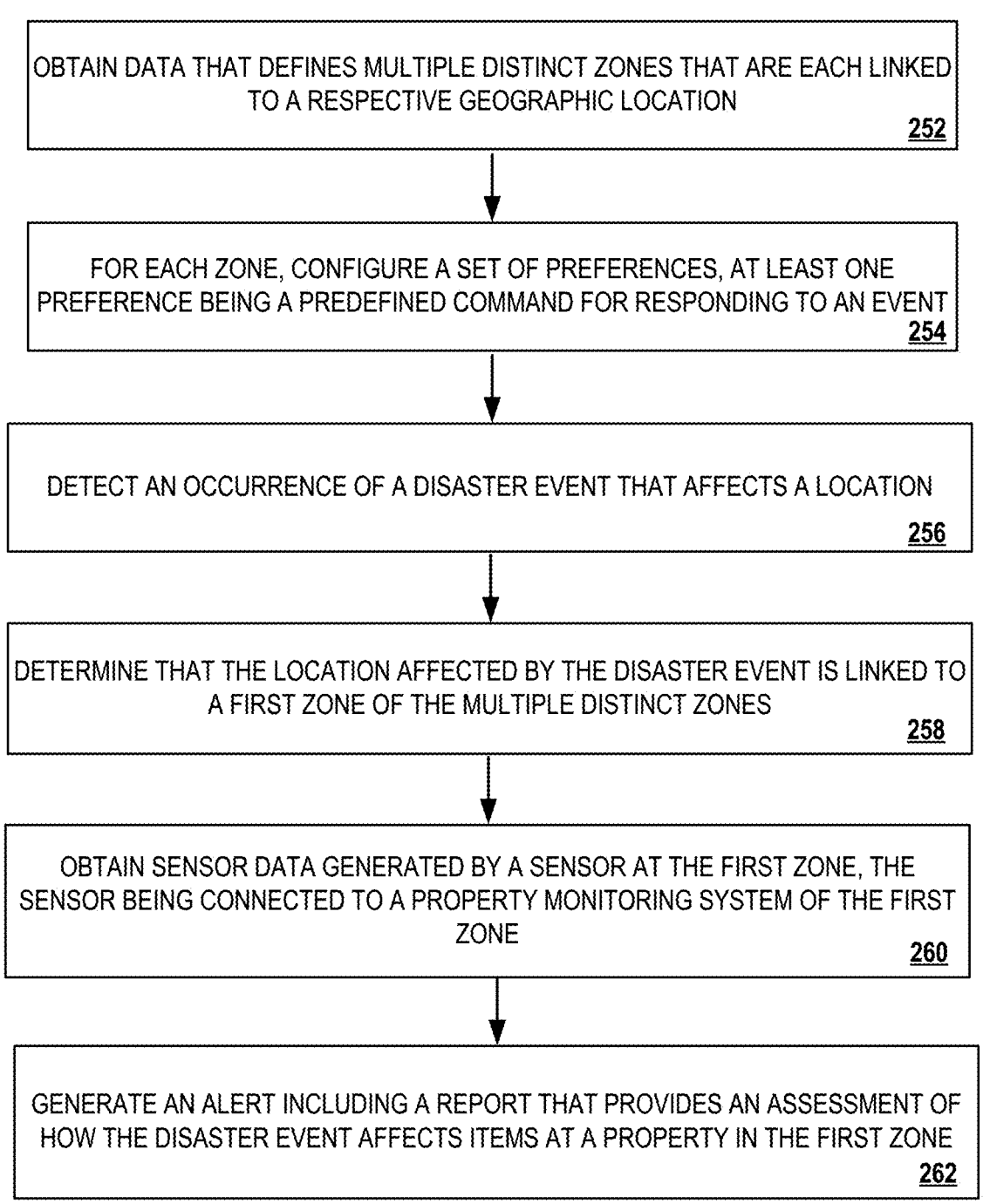

FIG. 2A and FIG. 2B each show a respective example process 200, 250 for performing one or more bulk actions at a property 102. In particular, process 200 corresponds to an example user workflow associated with one or more alerts that may be generated by system 100 using the monitoring server 160. Process 200, 250 can each be implemented or performed using the systems described in this document. Descriptions of process 200, 250 may reference one or more of the above-mentioned computing resources of system 100. In some implementations, steps of process 200, 250 are enabled by programmed instructions that are executable by processing devices of the systems described in this document.

Referring now to process 200 of FIG. 2A, the monitoring server 160 generates an example alert that includes text-based information about a disaster event that may have affected one or more properties within a zone that is associated with a user, e.g., an occupant, tenant, or property manager of the one or more properties (202). In some implementations, the alert may indicate that a sensor at one of the properties, within a zone or location assigned to the user, confirmed unusual activity at the property and/or damage to an item at the property. The alert can include one or more active links 212. At least one link can used to obtain a report that provides additional details about the unusual activity or damage to the item.

A user, e.g., a property manager or occupant that typically resides at the property, can interact with at least one active link labeled "View Report" to obtain the report or view the additional details within the report (204). For example, the report can include a breakdown of the sensor/video data that was obtained or generated by sensors positioned at one or more affected locations at the property or within a given zone. In some implementations, an interface screen that displays the report can include options ignoring the report or continuing to a particular section of the report (214).

The alert can also include options for applying one or more default bulk actions (206). In some implementations, the alert can include a listing of default bulk actions that is presented for selection to a user. For example, the listing of default bulk actions may be presented to the user based on a set of references for the user that were previously configured by the monitoring server 160. In some implementations, the user manually configures the set of preferences by interacting with the monitoring server 160 via an example application program. The alert can include selectable options for selecting one or more zones or locations including properties at each location. The alert can also include options for adjusting settings or preferences of the user as well as for developing customized actions (e.g., default bulk actions) that can be performed by a property monitoring system when a disaster event occurs near the property (216).

The alert can also provide a list of bulk actions with associated checkboxes (208). For example, when the user selects to define customized actions the workflow can be configured to present a listing of bulk actions. In some implementations, the alert corresponds to an example workflow and steps or processes of the workflow are represented at different visual interfaces of an application program. For example, at one interface of the workflow, the user can interact with an option for selecting from the different properties, zones, or locations that are assigned to the user (218). In response to clicking, selecting, or otherwise interacting with an option to "Select Locations," the system 100 can then present a listing of affected locations, e.g., with checkboxes, to the user (210). The user can select (using the checkboxes) one or more locations from the list of affected locations to cause the system 100 to apply a particular default bulk action if a disaster event is detected within a threshold proximity to a property, a zone, or a location assigned to the user (210). The system 100 then applies the selected actions to the selected locations (222).

Referring now to process 250 of FIG. 2B, the monitoring server 160 obtains data that defines a zone among multiple zones, where each zone of the multiple zones can be related to a respective geographic location (252). For example, the monitoring server 160 can include a database of properties that are each located at different geographic locations. The monitoring server 160 can be configured to obtain data associated with each property so as to define one or more zones, where each zone includes one or more properties. For example, at least one zone can include a set of properties, where the set includes multiple related properties. In some cases, properties in a set are related when each property is managed by the same property manager or property management entity.

The monitoring server 160 configures a set of preferences for each zone among the multiple zones (254). In some implementations, at least one preference in the set of preferences is for a predefined command that used by the monitoring server 160 for responding to a particular event, such as a disaster event. For example, at least one predefined command can trigger or cause a particular security action to be executed by an example property monitoring system. The property monitoring system can be connected to multiple distinct sensors at one or more properties in the set of properties. The various preferences that can be configured are described in more detail below.

System 100 detects an occurrence of a disaster event that affects a particular geographic location (256). For example, the monitoring server 160 can periodically receive data (e.g., new data) from an external database 145. In some implementations, the external database 145 is a private database or a public database, such as a government services databases that tracks storms and records magnitudes of earthquakes. The monitoring server 160 determines whether the particular geographic location that is affected by the disaster event is related to a first zone that is defined at the monitoring server (258).

For example, the monitoring server 160 obtains new data from an example public database and uses the disaster event detection engine 170 to analyze the new data. Detection engine 170 analyzes the new data to identify a location of the disaster event. Based on the analysis, the detection engine 170 may detect that one or more zones include properties that are located within a threshold distance of the disaster event. Hence, the monitoring server 160 uses the detection engine 170 to determine whether the particular geographic location that is affected by the disaster event is related to one or more zones based on the detection engine 170 detecting that at least one property in the zone is located within a threshold distance of the disaster event.

In response to monitoring server 160 determining that the particular geographic location affected by the disaster event is related to the first zone, a property monitoring system that is connected to a property in the first zone obtains sensor data generated by a sensor located at the first zone (260). For example, the sensor can be connected to a property monitoring system of the first zone. As discussed above, the sensor(s) at the property is configured to generate sensor data (e.g., image data) providing visual imagery or graphical depictions that show or indicate a condition of items located at a property in the first zone.

Based on the sensor data obtained from the sensor, the monitoring server generates an alert 175 that includes a report (262). The report 180 provides an assessment of how the disaster event affects an item at a property in the first zone. For example, the monitoring server 160 receives the obtained visual image data from the property monitoring system and processes the image data to generate the report 180 that is included in the alert 175. The monitoring server 160 can process the image data to determine whether the disaster event has moved or damaged items at the property in the first zone. In some implementations, the report 180 is configured or formatted so as to clearly indicate whether the disaster event has caused damaged to items at a property. For example, the monitoring server 160 can embed images obtained from the sensor in the report 180 to provide a visual of conditions at the property. System 100 uses the monitoring server 160 to provide the alert 175, along with the report 180, to a client/mobile device of an entity that manages the property in the first zone (262).

Figure 3:
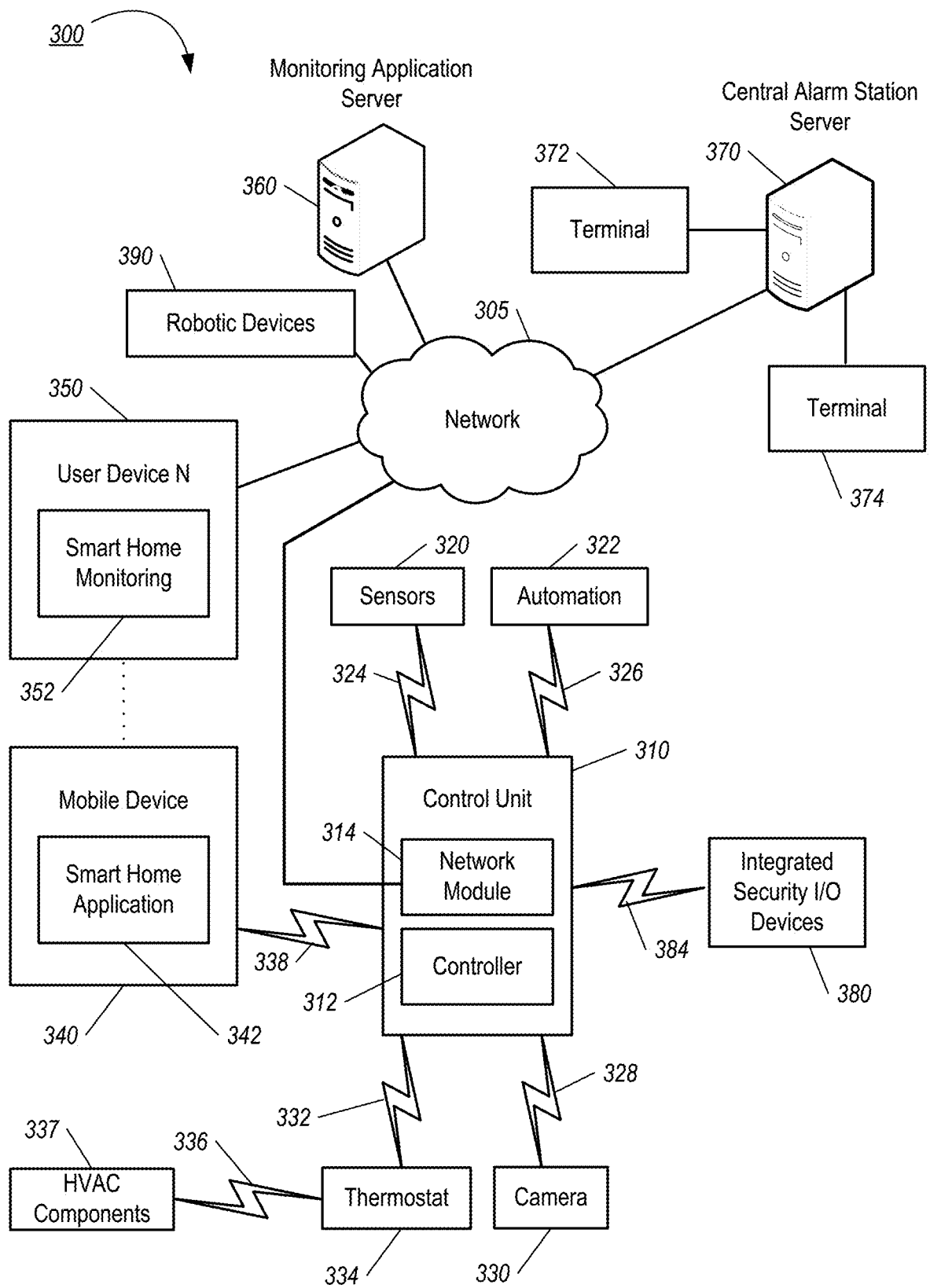
FIG. 3 shows a diagram illustrating an example property monitoring system.

FIG. 3 is a diagram illustrating an example of a property monitoring system 300. The electronic system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. In some implementations, the monitoring server 360 is configured to communicate with multiple property monitoring systems that are associated with respective properties of a zone 104. For example, the monitoring server 360 can use the central alarm station server 370 to communicate with the property monitoring systems for each of the properties 102 in zone 104. In some instances, the monitoring server 360 can use the central alarm station server 370 to perform one or more default bulk actions, such as actions for bulk arming, or de-arming, multiple property locations in a zone.

The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. Also, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert 175 to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data (e.g., alert 175) to the central alarm station server 370 over the network 305.

The monitoring server 360 may store sensor and image data received from multiple property monitoring systems and perform analysis of sensor and image data received from the monitoring systems. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300 or whether certain activities or activity patterns indicate damage to items at the property or home due to a disaster event. In some implementations, the monitoring server 360 may analyze the data for alarm conditions or may determine and perform actions (e.g., bulk location-based actions) at the home or property by issuing commands to one or more of the controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390 and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390 are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway, when the one or more user devices 340 and 350 are in close physical proximity to the sensors 320, the home automation controls 322, the camera 330, the thermostat 334, and the robotic devices 390, to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home"

state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

Figure 4:
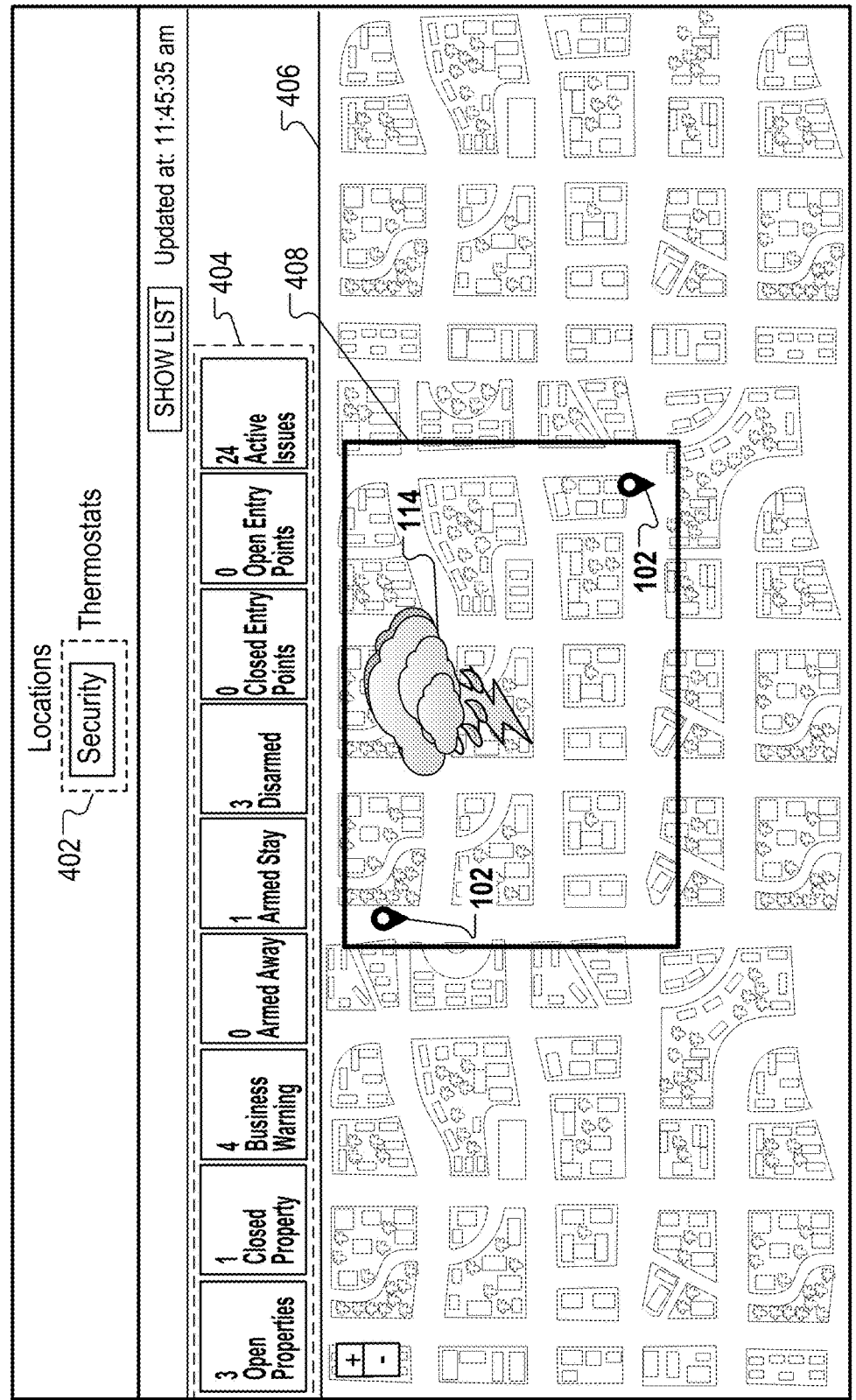
FIG. 4 shows an example graphical interface of an application program used to perform one or more actions at a property.

FIG. 4 shows an example graphical interface 400 of an application program used to perform one or more actions at a property. As discussed above, a property owner or resident communicates with the control unit 110 through a software ("smart home") application installed on their mobile device 140. In some implementations, interface 400 is an example interface that is generated for display at mobile/client device 140. In other implementations, the one or more authorized user devices 340 and 350 are also devices that host and display user interfaces such as interface 400.

The interface 400 includes security feature 402 for enabling or arming a security system at a property owned or managed by the user. The interface 400 also includes a status bar 404 that provides a concise grouping of information about a status or condition of properties assigned to the user. For example, the status bar 404 can inform the user about the number of properties that are closed or open, warnings that have been generated by a property monitoring system connected to a property, whether a security system at the property is armed or disarmed, whether certain entry points are open or closed, and the number/type of active issues that are affecting the property.

The interface 400 can also include a digital map 406 of an example location. The location can include a zone 408 that has one or more properties 102 located within the zone 408. The properties 102 may be affected by a disaster event 114. Hence, the interface 400 can include a graphical disaster event icon that represents the particular type of disaster event that is affecting the properties 102 located within zone 408. In some implementations, interface 400 represents an example graphical interface that is displayed to a property manager when the property manager accesses their user account via the smart home application. The interactive features of interface 400 can be used by the property manager to ensure the safety and security of their properties in respective zones that are indicated as being vulnerable to a natural disaster, such as a hurricane, tornado, or earthquake.

FIGS. 5A, 5B, and 5C each show a breakdown of features by event type. For example, each of FIGS. 5A, 5B, and 5C shows a respective table 500, 510, and 520 that includes information about different types of disaster events and external databases 145 (e.g., public databases) that can be used to obtain data describing attributes of the disaster events. The tables 500, 510, and 520 also include information about example sensors 120 that may be located at a property 102 and the sensors corresponding uses. Various default bulk actions are also included at the respective tables 500, 510, and 520. As described above, the bulk actions can be performed by a property monitoring system in response to the monitoring server determining that a disaster event has affected items at a property.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
obtaining, at a monitoring server, data that defines a zone from among a plurality of zones;
for each zone among the plurality of zones, configuring, by the monitoring server, a set of preferences, at least one preference in the set of preferences being a command for responding to an event;
detecting an occurrence of a disaster event that affects a particular geographic location;
determining, by the monitoring server, whether the particular geographic location that is affected by the disaster event is related to a first zone of the plurality of zones;
in response to determining that the particular geographic location affected by the disaster event is related to the first zone, obtaining sensor data generated by a sensor at a property located in the first zone, the sensor being connected to a property monitoring system of the property;
based on the sensor data, determining, by the monitoring server, a likely effect of the disaster event on the property located in the first zone;
based on the likely effect of the disaster event on the property in the first zone, determining, by the monitoring server, a monitoring system action using the set of preferences configured by the monitoring server; and
providing, for output by the monitoring server and to each property monitoring system of the property and other properties in the first zone, one or more commands to perform the monitoring system action.

2. The method of claim 1, comprising:
providing, by the monitoring server and based on the sensor data, a first command to the property monitoring system of the property in the first zone, or to a respective property monitoring system of the other properties located in the first zone, using at least a predefined command in the set of preferences,
wherein the predefined command causes each of the property monitoring systems to perform a specific action as a response measure to the occurrence of the disaster event and a likely effect that the disaster event has on the properties in the first zone.

3. The method of claim 2, comprising:
performing, by the respective property monitoring system of each property located in the first zone, the specific action as the response measure, wherein the specific action comprises a bulk arming function that activates a security protocol of the respective property monitoring systems.

4. The method of claim 1, wherein the sensor data indicates that an item located at the property in the first zone is adversely affected by the disaster event.

5. The method of claim 1, wherein detecting the occurrence of the disaster event that affects the particular geographic location comprises:
obtaining, by the monitoring server, new data from an external database, the new data describing one or more disaster events associated with certain geographic locations;
in response to processing the new data at the monitoring server, determining, by an event detection engine of the monitoring server, a geographic association between a location of the property in the first zone and a respective location of each of the one or more disaster events; and
detecting the occurrence of the disaster event based on the determined association.

6. The method of claim 1, wherein determining that the particular geographic location affected by the disaster event is related to the first zone comprises:
determining that the first zone is within a threshold proximity of the particular geographic location, wherein the threshold proximity corresponds to a threshold used to predict a likelihood that items at a property located in the first zone will be adversely affected by the disaster event.

7. The method of claim 2, wherein the set of preferences comprises one or more of:
an alert timeout preference;
a user notification preference;
a default action preference; or
an inaction preference.

8. The method of claim 7, wherein the alert timeout preference specifies whether the respective property monitoring system of the property and other properties in the first zone:
performs the default action preference after a predefined timeout period ends without the monitoring server receiving a response to an alert that is provided to a client device of an entity that manages each property located in the first zone; or
selects the inaction preference after the predefined timeout period ends without the monitoring server receiving a response to the alert.

9. The method of claim 8, wherein the alert includes a disaster assessment report with one or more active links, and at least one active link enables the client device to:
adjust one or more preferences in the set of preferences;
provide a second, different command to at least the property monitoring system of the property to cause that particular property monitoring system to perform a specific action; or
transmit a bulk action command to the respective property monitoring system for each property in the first zone to cause each respective property monitoring system to concurrently perform a specific action.

10. The method of claim 1, comprising:
determining that no zone is defined for a particular geographic location affected by the disaster event;
in response to determining that no zone is defined for a particular geographic location affected by the disaster event, automatically defining a new, second zone that is different than the first zone; and
automatically storing data that defines the new, second zone in a storage medium of the monitoring server.

11. The method of claim 1, comprising:
processing, by a predictive model of an event detection engine of the monitoring server, the sensor data generated by the sensor at the property located in the first zone;
in response to processing the sensor data, generating, by the predictive model, inferences about a respective condition of items located at the property in the first zone based on parameter values in the sensor data that represent activity detected by the sensor at the property; and
determining, by the event detection engine and based on the inferences, that one or more of the items located at the property in the first zone are adversely affected by the disaster event.

12. The method of claim 11, wherein the sensor at the first zone comprises at least one of:
an accelerometer sensor;
a glass break sensor configured to detect damage to an item at the property in the first zone; and
an item location sensor configured to detect a physical location of an item at the property relative to a location of the first zone.

13. The method of claim 11, wherein the sensor at the property located in the first zone comprises at least one of:
a flood detection sensor;
a gas or fluid sensor;
a smoke detection sensor; and
a power sensor configured to detect a loss of electrical power at the zone.

14. A system, comprising:
one or more processing devices; and
one or more non-transitory machine-readable storage devices storing instructions that are executable by the one or more processing devices to cause performance of operations comprising:
obtaining, at a monitoring server, data that defines a zone from among a plurality of zones;
for each zone among the plurality of zones, configuring, by the monitoring server, a set of preferences, at least one preference in the set of preferences being a command for responding to an event;
detecting an occurrence of a disaster event that affects a particular geographic location;

determining, by the monitoring server, whether the particular geographic location that is affected by the disaster event is related to a first zone of the plurality of zones;

in response to determining that the particular geographic location affected by the disaster event is related to the first zone, obtaining sensor data generated by a sensor at a property located in the first zone, the sensor being connected to a property monitoring system of the property;

based on the sensor data, determining, by the monitoring server, a likely effect of the disaster event on the property located in the first zone;

based on the likely effect of the disaster event on the property in the first zone, determining, by the monitoring server, a monitoring system action using the set of preferences configured by the monitoring server; and providing, for output by the monitoring server and to each property monitoring system of the property and other properties in the first zone, one or more commands to perform the monitoring system action.

15. The system of claim 14, wherein the operations comprise:

providing, by the monitoring server and based on the sensor data, a first command to the property monitoring system of the property in the first zone, or to a respective property monitoring system of the other properties located in the first zone, using at least a predefined command in the set of preferences, wherein the predefined command causes each of the property monitoring systems to perform a specific action as a response measure to the occurrence of the disaster event and a likely effect that the disaster event has on the properties in the first zone.

16. The system of claim 15, wherein the operations comprise:

performing, by the respective property monitoring system of each property located in the first zone, the specific action as the response measure, wherein the specific action comprises a bulk arming function that activates a security protocol of the respective property monitoring systems.

17. The system of claim 14, wherein detecting the occurrence of the disaster event that affects the particular geographic location comprises:

obtaining, by the monitoring server, new data from an external database, the new data describing one or more disaster events associated with certain geographic locations;

in response to processing the new data at the monitoring server, determining, by an event detection engine of the monitoring server, a geographic association between a location of the property in the first zone and a respective location of each of the one or more disaster events; and detecting the occurrence of the disaster event based on the determined association.

18. The system of claim 14, wherein determining that the particular geographic location affected by the disaster event is related to the first zone comprises:

determining that the first zone is within a threshold proximity of the particular geographic location, wherein the threshold proximity corresponds to a threshold used to predict a likelihood that items at a property located in the first zone will be adversely affected by the disaster event.

19. The system of claim 15, wherein the operations comprise:

processing, by a predictive model of an event detection engine of the monitoring server, the sensor data generated by the sensor at the property located in the first zone;

in response to processing the sensor data, generating, by the predictive model, inferences about a respective condition of items located at the property in the first zone based on parameter values in the sensor data that represent activity detected by the sensor at the property; and determining, by the event detection engine and based on the inferences, that one or more of the items located at the property in the first zone are adversely affected by the disaster event.

20. One or more non-transitory machine-readable storage devices storing instructions that are executable by one or more processing devices to cause performance of operations comprising:

obtaining, at a monitoring server, data that defines a zone from among a plurality of zones;

for each zone among the plurality of zones, configuring, by the monitoring server, a set of preferences, at least one preference in the set of preferences being a command for responding to an event;

detecting an occurrence of a disaster event that affects a particular geographic location;

determining, by the monitoring server, whether the particular geographic location that is affected by the disaster event is related to a first zone of the plurality of zones;

in response to determining that the particular geographic location affected by the disaster event is related to the first zone, obtaining sensor data generated by a sensor at a property located in the first zone, the sensor being connected to a property monitoring system of the property;

based on the sensor data, determining, by the monitoring server, a likely effect of the disaster event on the property located in the first zone;

based on the likely effect of the disaster event on the property in the first zone, determining, by the monitoring server, a monitoring system action using the set of preferences configured by the monitoring server; and providing, for output by the monitoring server and to each property monitoring system of the property and other properties in the first zone, one or more commands to perform the monitoring system action.

* * * * *